(12) United States Patent
Wu et al.

(10) Patent No.: US 9,510,298 B2
(45) Date of Patent: Nov. 29, 2016

(54) METHOD, DEVICE, AND SYSTEM FOR TRANSMITTING DATA BASED ON HARQ

(71) Applicant: Huawei Technologies Co., Ltd., Shenzhen, Guangdong (CN)

(72) Inventors: Ye Wu, Shanghai (CN); Wei Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 169 days.

(21) Appl. No.: 14/542,381

(22) Filed: Nov. 14, 2014

(65) Prior Publication Data

US 2015/0071267 A1   Mar. 12, 2015

Related U.S. Application Data

(63) Continuation of application No. PCT/CN2013/074004, filed on Apr. 10, 2013.

(30) Foreign Application Priority Data

May 16, 2012 (CN) .......................... 2012 1 0151260

(51) Int. Cl.
*H04W 4/00* (2009.01)
*H04W 52/24* (2009.01)
(Continued)

(52) U.S. Cl.
CPC .......... *H04W 52/241* (2013.01); *H04L 1/1893* (2013.01); *H04L 5/0057* (2013.01); *H04W 52/48* (2013.01); *H04W 52/50* (2013.01);
(Continued)

(58) Field of Classification Search
CPC ........................... H04L 1/1893; H04L 5/0057
USPC ........................................ 370/336, 332, 318
See application file for complete search history.

(56) References Cited

U.S. PATENT DOCUMENTS 7,835,337 B2 * 11/2010 Kim .......................... H04L 1/06
370/338
8,532,164 B2 * 9/2013 Hoshino ............... H04L 1/0001
370/278

(Continued)

FOREIGN PATENT DOCUMENTS

CN        1463098 A      12/2003
CN      101174931 A       5/2008
(Continued)

*Primary Examiner* — Ricky Ngo
*Assistant Examiner* — Dewanda Samuel

(57) ABSTRACT

Embodiments of the present invention provide a method, a device, and a system for transmitting data based on a hybrid automatic repeat request (HARQ). The method includes: adjusting, according to current physical resources, a channel quality indicator (CQI) fed back by a terminal to obtain an adjusted CQI and determining an initial transmit power corresponding to the adjusted CQI; calculating an optimum number $N_{RV}$ of redundant versions (RVs) according to a signal-to-noise ratio (SNR) gain, the adjusted CQI, and a requirement on quality of service of the terminal; adjusting the initial transmit power according to the optimum number of RVs and the adjusted CQI; and using $N_{RV}$ transmit time intervals (TTIs) and the adjusted transmit power to transmit $N_{RV}$ RVs of a transport block (TB) to the terminal. The embodiments of the present invention further provide a base station, a terminal, and a system for transmitting data.

16 Claims, 6 Drawing Sheets

(51) Int. Cl.
  *H04W 52/50*   (2009.01)
  *H04L 1/18*    (2006.01)
  *H04L 5/00*    (2006.01)
  *H04W 72/04*   (2009.01)
  *H04W 52/48*   (2009.01)
  *H04W 88/02*   (2009.01)
  *H04W 52/26*   (2009.01)
  *H04B 17/24*   (2015.01)

(52) U.S. Cl.
  CPC ..... *H04W72/0413* (2013.01); *H04W 72/0446* (2013.01); *H04B 17/24* (2015.01); *H04W 52/265* (2013.01); *H04W 88/02* (2013.01); *Y02B 60/50* (2013.01)

(56) References Cited

U.S. PATENT DOCUMENTS

| | | | | |
|---|---|---|---|---|
| 2003/0109274 | A1* | 6/2003 | Budka | H04W 52/24 455/522 |
| 2003/0123396 | A1* | 7/2003 | Seo | H04W 52/286 370/252 |
| 2004/0179493 | A1* | 9/2004 | Khan | H04W 52/24 370/332 |
| 2005/0003782 | A1* | 1/2005 | Wintzell | H04L 1/005 455/226.3 |
| 2006/0064625 | A1* | 3/2006 | Klein | H04L 1/1671 714/776 |
| 2006/0190796 | A1* | 8/2006 | Hagiwara | H04L 1/0003 714/749 |
| 2006/0240859 | A1* | 10/2006 | Gervais | H04W 52/16 455/522 |
| 2008/0159323 | A1 | 7/2008 | Rinne et al. | |
| 2009/0125774 | A1* | 5/2009 | Kim | H04L 1/189 714/748 |
| 2009/0147720 | A1 | 6/2009 | Wang | |
| 2010/0322177 | A1 | 12/2010 | Luo et al. | |
| 2013/0294251 | A1 | 11/2013 | Hoshino et al. | |
| 2014/0079006 | A1 | 3/2014 | Wu et al. | |
| 2014/0355543 | A1 | 12/2014 | Golitschek Edler von Elbwart et al. | |

FOREIGN PATENT DOCUMENTS

| | | |
|---|---|---|
| CN | 101453301 A | 6/2009 |
| CN | 102084683 A | 6/2011 |
| CN | 102113258 A | 6/2011 |
| CN | 102197617 A | 9/2011 |
| EP | 2 068 482 A2 | 6/2009 |
| WO | WO 2012/044694 A1 | 4/2012 |

* cited by examiner

METHOD, DEVICE, AND SYSTEM FOR TRANSMITTING DATA BASED ON HARQ

CROSS-REFERENCE TO RELATED APPLICATIONS

This application is a continuation of International Application No. PCT/CN2013/074004, filed on Apr. 10, 2013, which claims priority to Chinese Patent Application No. 201210151260.X, filed on May 16, 2012, both of which are hereby incorporated by reference in their entireties.

TECHNICAL FIELD

The present invention relates to communications technologies, and in particular, to a method, a device, and a system for transmitting data based on HARQ.

BACKGROUND

As a key technology in modern wireless communication, a hybrid automatic repeat request (HARQ) technology effectively ensures reliable transmission of wireless data and is widely used in high speed downlink packet access (HSDPA) and long term evolution (LTE). The HARQ can be classified into three types based on an implementation mechanism. The first type of the HARQ (herein "HARQ TypeI") is also called a conventional ARQ. According to HARQ TypeI, a receive end first performs an error correction for a data packet; if any error fails to be corrected, a data packet repeat request is sent, and the incorrect data packet is discarded; and during retransmission, a same forward error correction code is used, and redundancy information is unchanged. The second type of the HARQ (herein "HARQ TypeII") belongs to an incremental redundancy (IR) ARQ mechanism of a full redundancy manner. According to HARQ TypeII, during retransmission, system bit information is not included, only new redundancy information is carried to assist in decoding, and the new redundancy information is combined with previously received information at the receive end so as to form a forward error correction code that has a more powerful error correction capability and further reduce an error rate. The third type of the HARQ (herein "HARQ TypeIII") is also called a partial redundancy HARQ and also belongs to an incremental redundancy mechanism. According to HARQ TypeIII, the receive end combines data experiencing transmission for many times and then decodes the data, and retransmission data includes redundancy and system bits, and can be decoded independently. The LTE/HSDPA uses both the HARQ TypeII and the HARQ TypeIII. The LTE includes four redundant versions (RV), that is RV0-RV3. The HSDPA includes eight redundant versions, that is, RV0-RV8. FIG. 1 is a schematic diagram of a typical HARQ transmission mechanism in the prior art. As shown in FIG. 1, in the typical HARQ transmission mechanism, a transmit end first transmits one RV of one transport block (TB); a receive end receives the RV and then decodes the RV. If the decoding is successful, a positive acknowledgement (ACK) is fed back; and if the decoding fails, a negative acknowledgement (NACK) is fed back. After receiving the NACK, the transmit end continues to send an RV of the TB until the receive end succeeds in decoding the RV and feeds back an ACK.

In the prior art, adaptive modulation and coding (AMC) is used more and more widely in the LTE/HSDPA. Accordingly, a channel quality indicator (CQI) feedback is also mandatory. The receive end first measures a signal to interference plus noise ratio (SINR) and then matches the SINR with the CQI, and the receive end feeds back the matched CQI to the transmit end. A CQI feedback may provide a base station with a basis of dynamically adjusting a modulation and coding manner. The larger a CQI feedback value is, the larger the SINR of the receive end is, the higher a modulation order borne by a radio link is, and the higher a channel coding rate is. Each CQI corresponds to a curve of mappings between the SINRs and block error rates (BLER). FIG. 2 is a schematic diagram of a curve of mappings between SINRs and BLERs in the prior art. For the receive end, a CQI fed back is the highest CQI that can be supported in a channel condition when a requirement that BLER<=0.1 in transmission over an air interface for one time is met, so that a possible highest instantaneous throughput is supported.

However, when the receive end seeks high throughput, required power consumption is relatively high. This reduces the data transmission efficiency.

SUMMARY

Embodiments of the present invent ion provide a method, a device, and a system for transmitting data based on an HARQ, so as to implement efficient data transmission without affecting system throughput.

According to one aspect, an embodiment of the present invention provides a method for transmitting data based on a hybrid automatic repeat request (HARQ), including:

adjusting, according to current physical resources, a channel quality indicator CQI fed back by a terminal to obtain an adjusted CQI;

determining initial transmit power corresponding to the adjusted CQI;

calculating an optimum number $N_{RV}$ of redundant versions RVs according to the adjusted CQI, a requirements on quality of service of the terminal, and a signal-to-noise ratio SNR gain when a base station performs transmission by using an HARQ, where the SNR gain is determined according to a ratio of an SNR when the base station performs transmission without using the HARQ to an SNR when the base station performs transmission by using the HARQ, the optimum number of RVs is the number $N_{RV}$ required by the base station to send a transport block TB to the terminal, and the optimum number $N_{RV}$ is a natural number;

adjusting the initial transmit power according to the optimum number $N_{RV}$ and the adjusted CQI to obtain an adjusted transmit power; and sending $N_{RV}$ RVs of the TB to the terminal by using $N_{RV}$ transmission time intervals TTIs and the adjusted transmit power.

According to another aspect, an embodiment of the present invention provides another method for transmitting data based on an HARQ, including:

receiving an adjusted channel quality indicator CQI and an initial transmit power corresponding to an adjusted CQI, where the adjusted CQI and the initial transmit power are sent by a base station, and the adjusted CQI is obtained by the base station after adjusting a measured CQI according to current physical resources;

receiving an optimum number $N_{RV}$ of RVs calculated by the base station and an adjusted transmit power, where the optimum number $N_{RV}$ of RVs is calculated and obtained by the base station according to the adjusted CQI, requirements on quality of service of a terminal, and a signal-to-noise ratio SNR gain when the base station performs transmission by using an HARQ, the adjusted transmit power is obtained by the base station by adjusting the initial transmit power according to the optimum number $N_{RV}$ of RVs and the adjusted CQI, the SNR gain is determined according to a ratio of an SNR when the base station performs transmission without using the HARQ to an SNR when the base station performs transmission by using the HARQ, the optimum number $N_{RV}$ of RVs is the number of RVs required by the base station to send a transport block TB to the terminal, and $N_{RV}$ is a natural number; and sending the optimum number $N_{RV}$ of RVs of the TB to the base station by using $N_{RV}$ transmission time intervals TTIs and the adjusted transmit power.

According to still another aspect, an embodiment of the present invention provides a base station, including:

a CQI adjusting module, configured to adjust, according to current physical resources, a channel quality indicator CQI fed back by a terminal to obtain an adjusted CQI and determine an initial transmit power corresponding to the adjusted CQI;

a calculating module, configured to calculate an optimum number $N_{RV}$ of redundant versions RVs according to the adjusted CQI, requirements on quality of service of the terminal, and a signal-to-noise ratio SNR gain when the base station performs transmission by using a hybrid automatic repeat request HARQ, where the SNR gain is determined according to a ratio of an SNR when the base station performs transmission without using the HARQ to an SNR when the base station performs transmission by using the HARQ, the optimum number $N_{RV}$ of RVs is the number of RVs required by the base station to send a transport block TB to the terminal, and $N_{RV}$ is a natural number;

a power adjusting module, configured to adjust the initial transmit power according to the optimum number $N_{RV}$ of RVs and the adjusted CQI to obtain the adjusted transmit power; and a downlink transmission module, configured to send the optimum number $N_{RV}$ of RVs of the TB to the terminal by using $N_{RV}$ transmission time intervals TTIs and the adjusted transmit power.

According to still another aspect, an embodiment of the present invention provides a terminal, including:

a first receiving module, configured to receive an adjusted channel quality indicator (CQI) and an initial transmit power corresponding to the adjusted CQI, where the adjusted CQI and the initial transmit power are sent by a base station, and the adjusted CQI is obtained by the base station after adjusting a measured CQI according to current physical resources;

a second receiving module, configured to receive the optimum number $N_{RV}$ of RVs calculated by the base station and adjusted transmit power, where the optimum number $N_{RV}$ of RVs is calculated and obtained by the base station according to the adjusted CQI, requirements on quality of service of the terminal, and a signal-to-noise ratio SNR gain when the base station performs transmission by using a hybrid automatic repeat request HARQ, the adjusted transmit power is obtained by the base station by adjusting the initial transmit power according to the optimum number $N_{RV}$ of RVs and the adjusted CQI, the SNR gain is determined according to a ratio of an SNR when the base station performs transmission without using the HARQ to an SNR when the base station performs transmission by using the HARQ, the optimum number $N_{RV}$ of RVs is the number of RVs required by the base station to send a transport block TB to the terminal, and $N_{RV}$ is a natural number; and an uplink transmission module, configured to send $N_{RV}$ RVs of the TB to the base station by using $N_{RV}$ transmission time intervals TTIs and the adjusted transmit power.

According to still another aspect, an embodiment of the present invention provides a system for transmitting data based on an HARQ, including the base station and the terminal.

According to various embodiments, the initial transmit power is adjusted to reduce instantaneous throughput of a user at a TTI level, and a part of saved transmit power is used according to the calculated optimum number of RVs to support data transmission of other $N_{RV}$ users at a same TTI at the same time, thereby efficiently utilizing power resources and efficiently transmitting data without reducing system throughput at the same time.

BRIEF DESCRIPTION OF THE DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

A technical problem to be solved in an embodiment of the present invention is how a conventional HSDPA/LTE air interface, even an air interface in the future, uses an HARQ technology to efficiently transmit data without affecting system throughput at the same time. On one aspect, on an existing HSDPA/LTE air interface, the HARQ technology mainly provides an efficient retransmission mechanism in a case where a decoding error occurs on a receive end during transmission for the first time so as to ensure effective system throughput. In another aspect, on the existing HSDPA/LTE air interface, especially on the HSDPA, regardless of a high or low load, in a process of a transmission format resource composite (TFRC), a media access control (MAC) layer always preferably meets full power transmission performed by one user, so that instantaneous throughput of a single user is ensured. However, it is actually a waste of power resources, because when compared with non-full power transmission, the full power transmission does not bring a proportional increase in throughput. Instead, the full power transmission seeks extreme throughput of a single user. If it is considered that a transmit end reduces transmit power of a single user at each TTI, that is, instantaneous throughput of the user at a TTI level is properly reduced, a part of saved power is used to support data transmission of another user at a same TTI at the same time, so that the overall effect is achieving an objective of saving the transmit power without reducing the system throughput at the same time.

Figure 1:
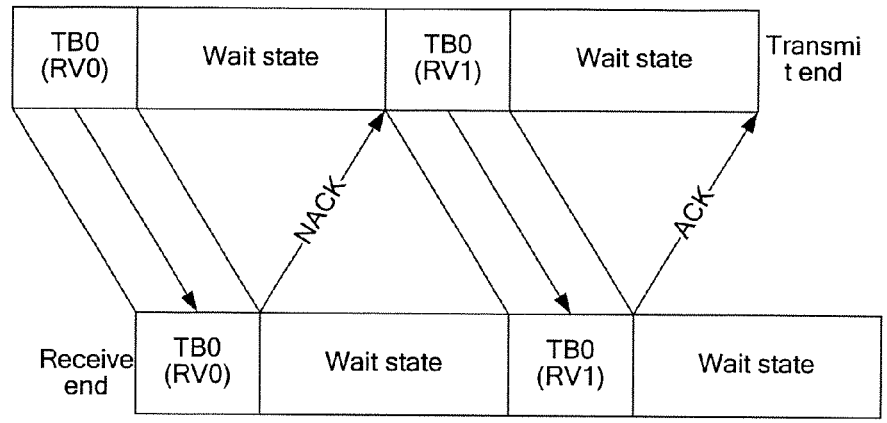
FIG. 1 is a schematic diagram of a typical HARQ transmission mechanism in the prior art.
Figure 2:
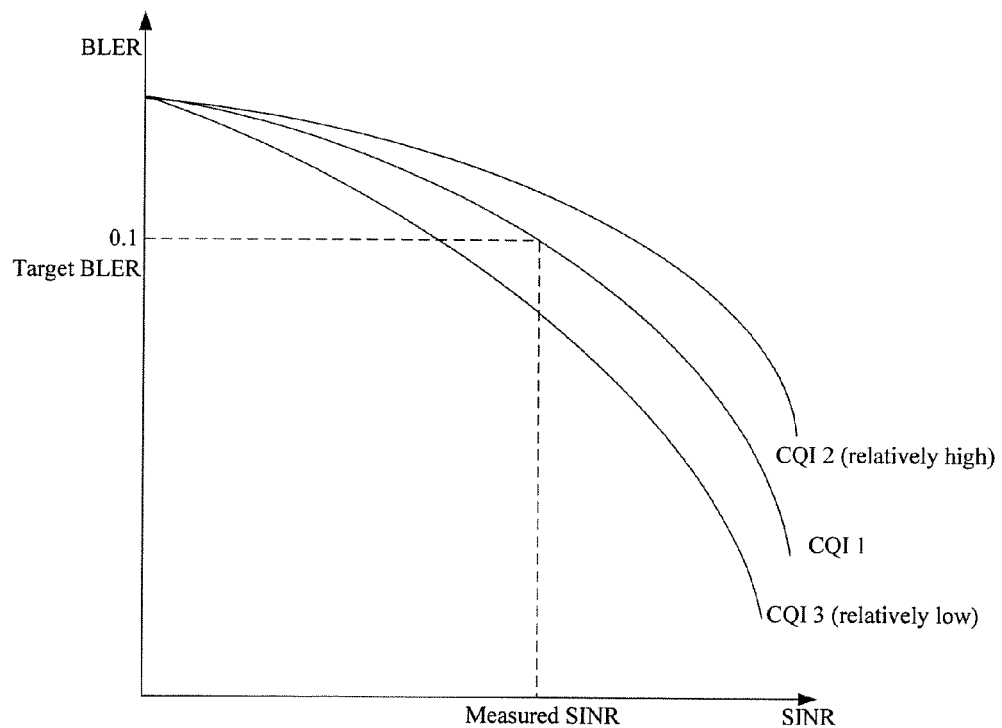
FIG. 2 is a schematic diagram of a curve of mappings between SINRs and BLERs in the prior art.
Figure 3:
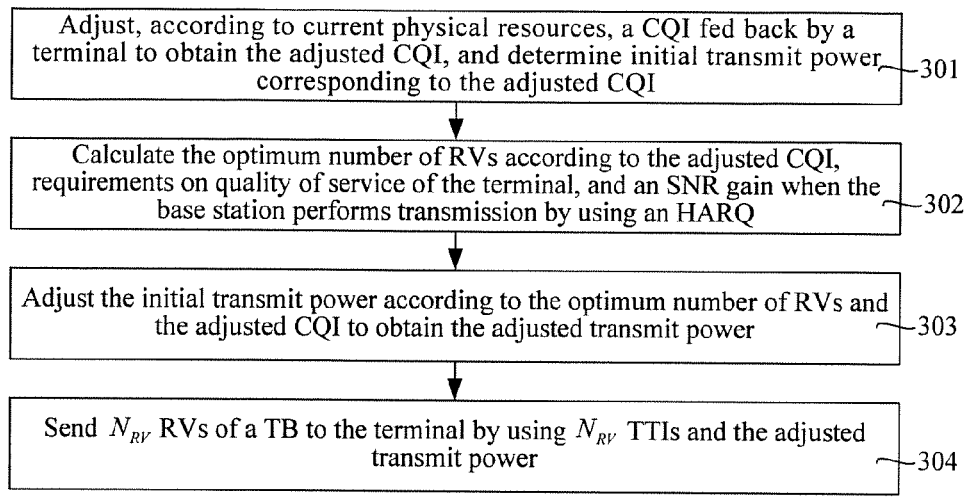
FIG. 3 is a flowchart of a first embodiment of a method for transmitting data based on an HARQ according to the present invention.

FIG. 3 is a flowchart of a method for transmitting data based on an HARQ according to an embodiment of the present invention. As shown in FIG. 3, this embodiment provides a method for transmitting data based on an HARQ. The method for transmitting data based on an HARQ may be specifically applied to an HSDPA or LTE system. In this embodiment, the technical solution of the present invention is described from a base station side. That is, a data transmission process in a downlink direction is described in this embodiment. This method may specifically include the following steps:

Step 301: Adjust, according to current physical resources, a CQI fed back by a terminal to obtain the adjusted CQI, and determine initial transmit power corresponding to the adjusted CQI.

In this embodiment, the number of RVs for energy-saving transmission performed by the terminal needs to be calculated and an adaptive adjustment is performed for transmit power to solve the preceding technical problem so as to save the transmit power without reducing system throughput. This step is that the base station adjusts, according to the current physical resources, the CQI fed back by the terminal to obtain the adjusted CQI and determines the initial transmit power corresponding to the adjusted CQI. The terminal may periodically or non-periodically feedback, to the base station, the CQI and a response feedback, e.g., an ACK/NACK, of the terminal about data. The CQI fed back by the terminal is a CQI that ensures, by using transmission for one time, that a BLER, for example, meets BLER<0.1. In an LTE, the CQI fed back may include a modulation and coding manner. In an HSDPA, the CQI fed back may include the number of the maximum code channels, a modulation manner, and the maximum value of a TB. After the base station receives the CQI fed back by the terminal, because the CQI fed back by the terminal may be inaccurate, a TFRC module in the base station adjusts the CQI according to a CQI recently fed back and the current physical resources. An adjustment principle may be ensuring, by adjusting the CQI, that an error rate of transmitting a block for one time is below 10%. Then a size of a corresponding TB and the initial transmit power $P_{init}$ are determined according to the adjusted CQI. A specific method for adjusting the CQI may be similar to a method in the prior art, and therefore no further details are provided herein. The physical resources may include a data buffer size, available bandwidth (a code channel), and the like.

Step 302: Calculate the optimum number $N_{RV}$ of RVs according to the adjusted CQI, requirements on quality of service of the terminal, and an SNR gain when the base station performs transmission by using the HARQ.

After adjusting the CQI, the base station calculates the optimum number $N_{RV}$ of RVs according to the adjusted CQI. Specifically, the base station calculates $N_{RV}$ according to the adjusted CQI, the requirements on quality of service of the terminal, and the SNR gain. The SNR gain is an SNR gain when the base station performs transmission by using the HARQ. The optimum number $N_{RV}$ of RVs is the number of RVs required by the base station to send a TB to the terminal, and $N_{RV}$ is a natural number. The SNR gain may be determined according to a ratio of an SNR when the base station performs transmission without using the HARQ to an SNR when the base station performs transmission by using the HARQ. Specifically, the SNR gain may be calculated and obtained by using the following formula (1):

$$g_{SNR} = \log_{10}\left(\frac{S_1}{S_2}\right) \quad (1)$$

where $g_{SNR}$ is the SNR gain when the base station performs transmission by using the HARQ, $S_1$ is an SNR when the base station performs transmission without using the HARQ, and $S_2$ is an SNR when the base station performs transmission by using the HARQ. When calculating the optimum number of RVs, the base station may determine the specific optimum number $N_{RV}$ of RVs according to a mapping between an SNR gain and the number of RVs with reference to the quality of service (QoS) of the terminal, where the SNR gain and the number of RVs are given by a vendor.

Step 303: Adjust the initial transmit power according to the optimum number of RVs and the adjusted CQI to obtain the adjusted transmit power.

After obtaining the optimum number $N_{RV}$ of RVs that meets the QoS requirements of the terminal, the base station adjusts the previously determined initial transmit power according to the adjusted CQI determined in step 301 and the optimum number of RVs to obtain the adjusted transmit power. That is, the transmit power is reallocated to acquire transmit power corresponding to the optimum number of RVs and the adjusted CQI, so that the terminal is capable of performing HARQ energy-saving transmission and meeting the QoS requirements at the same time, that is, efficiently transmitting data without affecting the system throughput at the same time.

Step 304: Send $N_{RV}$ RVs of the TB to the terminal by using $N_{RV}$ transmission time intervals TTIs and the adjusted transmit power.

After acquiring, in the preceding steps, the corresponding adjusted transmit power and the optimum number $N_{RV}$ of RVs that meets the QoS requirements of the terminal and allows the terminal to perform the energy-saving transmission, the base station may start from a TTI when data starts to be sent and use the $N_{RV}$ TTIs and the adjusted transmit power to consecutively send the $N_{RV}$ RVs of the TB to the terminal. The $N_{RV}$ RVs may be same RVs, or may be different RVs. After receiving of the $N_{RV}$ RVs is completed within specified time, the terminal may perform combination and channel decoding for the received RVs. If the terminal succeeds in the decoding, it feeds back an ACK to the base station. If the terminal fails in the decoding, it feeds back a NACK to the base station. At the same time when the terminal feeds back the ACK/NACK, it further feeds back, to the base station, a CQI that ensures a BLER by using transmission for one time, so that the base station starts to perform a next data transmission process after receiving the CQI fed back. That is, steps 301-304 in this embodiment are performed once again.

According to the method for transmitting data based on an HARQ provided in this embodiment, a base station adjusts a CQI fed back by a terminal, calculates the number $N_{RV}$ of RVs according to the adjusted CQI, requirements on quality of service of the terminal, and an SNR gain, adjusts initial transmit power according to the number of RVs and the adjusted CQI, and then uses $N_{RV}$ transmission time intervals TTIs and the adjusted transmit power to consecutively send $N_{RV}$ RVs of a TB to the terminal. In this embodiment, the initial transmit power is adjusted to properly reduce instantaneous throughput of a user at a TTI level, and a part of saved transmit power is used according to the accurately calculated optimum number of RVs to support data transmission by other $N_{RV}$ users at a same TTI at the same time, thereby efficiently utilizing power resources and efficiently transmitting data without reducing system throughput at the same time.

Figure 4:
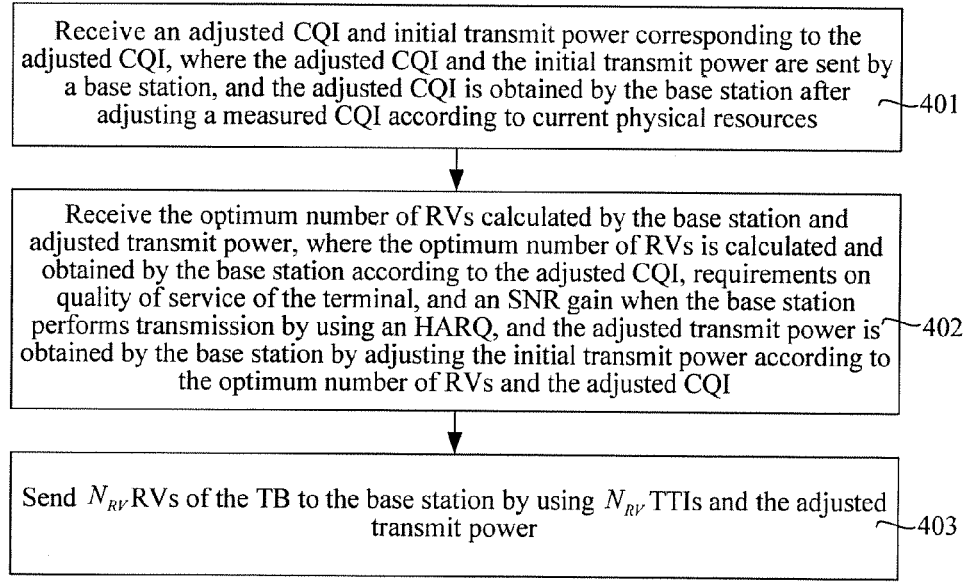
FIG. 4 is a flowchart of a second embodiment of a method for transmitting data based on an HARQ according to the present invention.

FIG. 4 is a flowchart of a method for transmitting data based on an HARQ according to an embodiment of the present invention. As shown in FIG. 4, this embodiment provides a method for transmitting data based on an HARQ. The method for transmitting data based on an HARQ may be specifically applied to an HSDPA or LTE system. In this embodiment, the technical solution of the present invention is described from a terminal side. That is, a data transmission process in an uplink direction is described in this embodiment. This method may specifically include the following steps:

Step 401: Receive an adjusted CQI and initial transmit power corresponding to the adjusted CQI, where the adjusted CQI and the initial transmit power are sent by a base station, and the adjusted CQI is obtained by the base station after adjusting a measured CQI according to current physical resources.

The data transmission process in the uplink direction of data transmission from the terminal to the base station is described in this embodiment. In the uplink direction, the base station first measures a CQI in the uplink direction, then adjusts the measured CQI according to the current physical resources to obtain the adjusted CQI, and determines the initial transmit power corresponding to the adjusted CQI. The base station sends the terminal the adjusted CQI and the initial transmit power corresponding to the adjusted CQI. This step is that the terminal receives the adjusted CQI and the initial transmit power corresponding to the adjusted CQI, where the adjusted CQI and the initial transmit power are sent by the base station.

Step 402: Receive the optimum number $N_{RV}$ of RVs calculated by the base station and adjusted transmit power, where the optimum number of RVs is calculated and obtained by the base station according to the adjusted CQI, requirements on quality of service of the terminal, and a signal-to-noise ratio SNR gain when the base station performs transmission by using the HARQ, and the adjusted transmit power is obtained by the base station by adjusting the initial transmit power according to the optimum number of RVs and the adjusted CQI.

After adjusting the measured CQI, the base station further calculates the optimum number of RVs for the adjusted CQI and the corresponding initial transmit power and adjusts the initial transmit power. This step is that the terminal receives the optimum number $N_{RV}$ of RVs calculated by the base station and the adjusted transmit power. The optimum number $N_{RV}$ of RVs is the number of RVs required by the base station to send a TB to the terminal, where $N_{RV}$ is a natural number, and $N_{RV}$ is calculated and obtained by the base station according to the adjusted CQI, the requirements on quality of service of the terminal, and the SNR gain when the base station performs transmission by using the HARQ. The adjusted transmit power is obtained by the base station by adjusting the initial transmit power according to the optimum number of RVs and the adjusted CQI. The SNR gain is determined according to a ratio of an SNR when the base station performs transmission without using the HARQ to an SNR when the base station performs transmission by using the HARQ. A specific method for calculating $N_{RV}$ and a method for adjusting the transmit power are consistent with the calculation method and the adjustment method in the downlink direction. In a practical case, the terminal may not acquire a data buffer size of the terminal. In this case, when $N_{RV}$ is calculated, a delay requirement may be ignored, and only a case where a GBR requirement is met is considered.

Step 403: Send $N_{RV}$ RVs of the TB to the base station by using $N_{RV}$ transmission time intervals TTIs and the adjusted transmit power.

After the terminal receives $N_{RV}$ calculated and obtained by the base station and the adjusted transmit power, the terminal uses the $N_{RV}$ TTIs and the adjusted transmit power to consecutively send the $N_{RV}$ RVs of the TB to the base station.

Further, in this embodiment, before the terminal transmits data to the base station, the terminal may further receive, at a TTI previous to a TTI used to start HARQ transmission, notification signaling sent by the base station, where the notification signaling carries a modulation and coding manner, available bandwidth, an HARQ process identity of the HARQ transmission, a sequence for sending the RVs, a start number of a TTI used for uplink transmission of the TB, and a TTI number of a response fed back by the base station, the start number of the TTI is notified by the base station, and the TTI that is described herein and used to start the HARQ transmission is the first TTI used by the terminal to send the RVs to the base station. That is, the notification signaling is received before the $N_{RV}$ TTIs are used to send the $N_{RV}$ RVs of the TB. Assuming that the RVs are sent at the second to $(N_{RV}+1)^{th}$ TTIs, the terminal needs to receive the notification signaling at the first TTI.

According to the method for transmitting data based on an HARQ provided in this embodiment, a terminal receives a CQI adjusted by a base station, receives the optimum number $N_{RV}$ of RVs that is calculated by the base station according to the adjusted CQI, requirements on quality of service of the terminal, and an SNR gain, and adjusts transmit power according to the optimum number of RVs and the adjusted CQI, and the terminal uses $N_{RV}$ transmission time intervals TTIs and the adjusted transmit power to consecutively send $N_{RV}$ RVs of a TB to the base station. In this embodiment, initial transmit power is adjusted to properly reduce instantaneous throughput of a user at a TTI level, and a part of saved transmit power is used according to the accurately calculated optimum number of RVs to support data transmission by other $N_{RV}$ users at a same TTI at the same time, thereby efficiently utilizing power resources and efficiently transmitting data without reducing system throughput at the same time.

Figure 5:
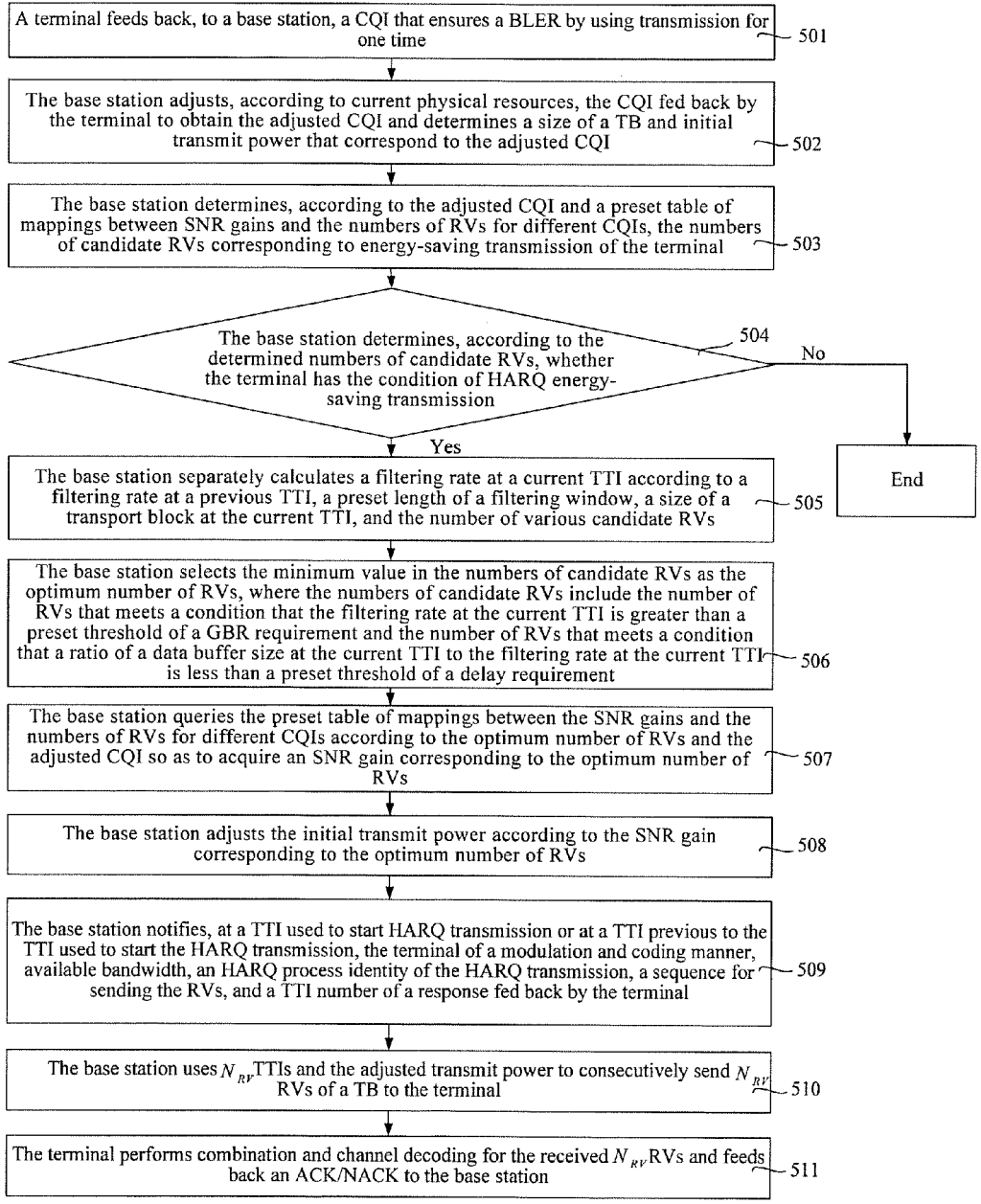
FIG. 5 is a flowchart of a third embodiment of a method for transmitting data based on an HARQ according to the present invention.

FIG. 5 is a flowchart of a method for transmitting data based on an HARQ according to an embodiment of the present invention. As shown in FIG. 5, this embodiment provides a method for transmitting data based on an HARQ, and the method may specifically include the following steps:

Step 501: A terminal feeds back, to a base station, a CQI that ensures a BLER by using transmission for one time.

This step is that the terminal feeds back, to the base station, an ACK/NACK about data according to a decoding success result or a decoding failure result after the terminal receives the data when the base station performs transmission and performs combination and channel decoding for the data. In addition, the terminal further feeds back, to the base station, the CQI that ensures a BLER by using transmission for one time, for example, feeding back a CQI meeting that BLER<0.1. In an LTE, the CQI fed back may include a modulation and coding manner. In an HSDPA, the CQI fed back may include the number of the maximum code channels, a modulation manner, and the maximum value of a TB.

Step 502: The base station adjusts, according to current physical resources, the CQI fed back by the terminal to obtain the adjusted CQI and determines a size of a TB and initial transmit power that correspond to the adjusted CQI.

After receiving the CQI fed back by the terminal, the base station adjusts the CQI according to a CQI recently fed back, a data buffer size, available bandwidth (a code channel), and the like to obtain the adjusted CQI. The base station further determines, according to the adjusted CQI, the size of the TB and the initial transmit power $P_{init}$ that correspond to the adjusted CQI. A specific method for adjusting the CQI may be similar to a method in the prior art, and therefore no further details are provided herein.

Step 503: The base station determines, according to the adjusted CQI and a preset table of mappings between SNR gains and the numbers of RVs for different CQIs, the numbers of candidate RVs corresponding to energy-saving transmission of the terminal.

After the CQI is adjusted and the corresponding initial transmit power is determined, this step is that the base station calculates the optimum number of RVs and allocates transmit power. In this embodiment, power used by the base station to transmit old data after the terminal feeds back the NACK is the same as power used by the base station to transmit new data, and a same power allocation algorithm is used. In this embodiment, an SNR gain is an SNR gain when transmission is performed by using the HARQ, and for a certain CQI, the SNR gain is defined as a reduced value of an SNR that is required before retransmission is performed and compared with a minimum SNR required to reach a certain BLER (which is set to 0.1 in this embodiment) after the retransmission is added. This step is that the base station determines, according to the adjusted CQI and the preset table of the mappings between the SNR gains and the numbers of RVs for different CQIs, the numbers of candidate RVs corresponding to the energy-saving transmission of the terminal. The table of the mappings between the SNR gains and the numbers of RVs for different CQIs may be obtained according to data provided by a device vendor; that is, mappings between the SNR gains and the numbers of RVs may be obtained for different CQIs. The following table 1 shows mappings between the SNR gains and the numbers of RVs for different CQIs in the LTE, and the following table 2 shows mappings between the SNR gains and the numbers of RVs for different CQIs in the HSDPA.

TABLE 1

Mappings between the SNR gains and the numbers of RVs for different CQIs in the LTE

|  | CQI= 0 | CQI = 1 | CQI = 2 | CQI = 3 | CQI = 4 | CQI = 5 | CQI = 6 | CQI = 7 | CQI = 8 | CQI = 9 | CQI = 10 |
|---|---|---|---|---|---|---|---|---|---|---|---|
| $N_{RV} = 2$ |  | 2.952712 | 2.98648 | 3.045172 | 3.137632 | 3.250996 | 3.374008 | 1.32876 | 1.3758 | 1.42872 | 2.962136 |
| $N_{RV} = 3$ |  | 4.696984 | 4.76536 | 4.884204 | 5.071424 | 5.300972 | 5.550056 | 3.92843 | 4.87315 | 5.93596 | 5.016208 |
| $N_{RV} = 4$ |  | 5.776468 | 5.86072 | 6.007158 | 6.237848 | 6.520694 | 6.827612 | 4.727392 | 5.78736 | 6.979824 | 6.081248 |

TABLE 2

Mappings between the SNR gains and the numbers of RVs for different CQIs in the HSDPA

| CQI | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|
| $N_{RV} = 2$ | 3.3 | 3.7 | 4 | 3.8 | 4.2 | 4.2 | 3.8 | 4.1 | 4.3 | 4.5 | 4.8 | 4.9 | 5.3 | 5.2 | 5.4 | 5.5 | 6 | 6.4 |
| $N_{RV} = 3$ | 5.2 | 5.6 | 5.7 | 5.6 | 6.1 | 6.1 | 5.6 | 6 | 6.3 | 6.7 | 7 | 7.3 | 7.7 | 7.6 | 7.9 | 7.9 | 8.7 | 8.7 |
| $N_{RV} = 4$ | 6.4 | 6.7 | 6.9 | 6.9 | 7.5 | 7.5 | 7 | 7.3 | 7.5 | 8 | 8.3 | 9 | 9.5 | 9.3 | 9.7 | 9.8 | 10.1 | 10.5 |

Table 1 and Table 2 are mappings between the SNR gains and the numbers of RVs, as examples. A sequence, which corresponds to Table 1 and Table 2, for sending the RVs is RV0, RV1, RV2, and RV3. In a same condition, each device vendor may obtain a slightly different mapping table due to a different sequence for sending the RVs. As long as a sequence for sending the RVs is determined, a corresponding mapping table can be obtained, even if not in an LTE system or in an HSPDA system.

In this embodiment, when the numbers of candidate RVs are determined, a corresponding column of SNR gains are first obtained from Table 1 or Table 2 according to the adjusted CQI. If the number of RVs is 2, that is, the number of retransmission times is 1, the base station occupies two consecutive TTIs for transmitting the RVs, and a corresponding SNR gain can be obtained by querying Table 1 or Table 2. When the SNR gain>10lg2, it indicates that the terminal is capable of performing HARQ energy-saving transmission for $N_{RV}=2$ times. If the number of RVs is 3, that is, the number of retransmission times is 2, the base station occupies three consecutive TTIs for transmitting the RVs, and a corresponding SNR gain can be obtained by querying Table 1 or Table 2. When the SNR gain>10lg3, it indicates that the terminal is capable of performing the HARQ energy-saving transmission for $N_{RV}=3$ times. If the number of RVs is 4, that is, the number of retransmission times is 3, the base station occupies four consecutive TTIs for transmitting the RVs, and a corresponding SNR gain can be obtained by querying Table 1 or Table 2. When the SNR gain>10lg4, it indicates that the terminal is capable of performing the HARQ energy-saving transmission for $N_{RV}=4$ times. Similarly, the numbers of all candidate RVs that correspond to the energy-saving transmission of the terminal can be obtained; that is, the numbers of the obtained candidate RVs may be 2, 3, and 4.

In addition, Table 1 and Table 2 are still taken as examples. In a case where a system provides certain redundancy, a condition for the terminal to perform the HARQ energy-saving transmission may be further defined. For example, if the number of retransmission times is 1, only when the SNR gain is greater than or equal to 3.8 dB, it can be preliminarily determined that the terminal is capable of performing the HARQ energy-saving transmission. If the number of retransmission times is 2, only when the SNR gain is greater than or equal to 5.5 dB, it can be preliminarily determined that the terminal is capable of performing the HARQ energy-saving transmission. If the number of retransmission times is 3, only when the SNR gain is greater than or equal to 6.8 dB, it can be preliminarily determined that the terminal is capable of performing the HARQ energy-saving transmission.

Step 504: The base station determines, according to the determined numbers of candidate RVs, whether the terminal has the condition of the HARQ energy-saving transmission; if yes, performs step 505; otherwise, this process ends.

The base station determines, according to the determined numbers of candidate RVs, whether the terminal has the condition of the HARQ energy-saving transmission. When the determined numbers of candidate RVs are not 1, it indicates that the terminal has the condition of the HARQ energy-saving transmission and the subsequent step 505 is performed. Otherwise, an existing method of TTI transmission for one time is used to transmit data to the terminal and this process ends.

Step 505: The base station separately calculates a filtering rate at a current TTI according to a filtering rate at a previous TTI, a preset length of a filtering window, a size of a transport block at the current TTI, and the number of candidate RVs.

After determining the numbers of candidate RVs that meet the condition for the terminal to perform the HARQ energy-saving transmission, the base station may further determine, according to QoS requirements of the terminal, the optimum number $N_{RV}$ of RVs, which meets the QoS requirements, in the numbers of candidate RVs. In this embodiment, the QoS requirements of the terminal may specifically be a guaranteed bit rate (GBR) requirement of the terminal and a delay requirement of the terminal. To meet the GBR requirement, the base station first separately calculates the filtering rate at the current TTI according to the filtering rate at the previous TTI, the preset length of the filtering window, the size of the transport block at the current TTI, and the number of candidate RVs. In this embodiment, when data is to be sent at the current TTI, the following formula (2) may be used to calculate the filtering rate at the current TTI:

$$R(i) = \frac{(N-1)*R(i-1)}{N} + \frac{TBS(i)}{N'_{RV}*N} \tag{2}$$

where R(i) is the filtering rate at the current TTI, which may specifically be an alpha filtering rate at the current TTI, R(i−1) is the filtering rate at the previous TTI, TBS(i) is the size of the transport block at the current TTI, $N'_{RV}$ is the number of candidate RVs, and the N is the preset length of the filtering window. Certainly, an equivalent R(i) expression may be used, that is, dividing TBS(i) by a TTI time length. When no data is to be sent at the current TTI, R(i) still needs to be updated, and the following formula (3) may be used to calculate the filtering rate at the current TTI:

$$R(i) = \frac{(N-1)*R(i-1)}{N} \tag{3}$$

In this step, the formula (2) or (3) may be used according to the number $N'_{RV}$ of candidate RVs that is determined in step 504 to separately obtain the alpha filtering rate corresponding to the current TTI.

Step 506: The base station selects the minimum value in the numbers of candidate RVs as the optimum number $N_{RV}$ of RVs, where the numbers of candidate RVs include the number of RVs that meets a condition that the filtering rate at the current TTI is greater than a preset threshold of the GBR requirement and the number of RVs that meets a condition that a ratio of a data buffer size at the current TTI to the filtering rate at the current TTI is less than a preset threshold of the delay requirement.

After the alpha filtering rate R(i), which corresponds to the number $N'_{RV}$ of candidate RVs, at the current TTI is calculated and obtained, when data is to be sent, that is, when transmission of the RVs needs to be determined, whether the corresponding filtering rate R(i) at the current TTI is greater than the preset threshold of the GBR requirement is determined, in order to meet the GBR requirement. The base station first selects the number of candidate RVs that meets the condition that R(i) is greater than the threshold of the GBR requirement, that is, selecting the number of candidate RVs that meets the condition shown in the following formula (4):

$$R(i)>c*GBR \tag{4}$$

where c is greater than or equal to 1, and c*GBR is the preset threshold of the GBR requirement. To meet the delay requirement, the base station requires that the number of candidate RVs further meet the condition that the ratio of the data buffer size at the current TTI to the filtering rate at the current TTI is less than the preset threshold of the delay requirement, that is, meeting the condition shown in the following formula (5):

$$\frac{queuelength(i) + bufferlength(i)}{R(i)} < D \quad (5)$$

where queuelength(i) is the number of bits in a MAC queue at the current TTI, bufferlength(i) is the number of bits in a buffer queue at the current TTI, the sum of queuelength (i) and bufferlength(i) is the data buffer size at the current TTI, and the D is the preset threshold of the delay requirement. The base station may select the minimum value between the numbers of candidate RVs that meet the conditions shown in the formula (4) and the formula (5) as the optimum number of RVs so as to determine $N_{RV}$.

Further, to meet the GBR requirement, the base station may specifically select the number of candidate RVs with the maximum SNR gain as the first number of candidate RVs from the numbers of candidate RVs that meet the condition shown in the formula (4), that is, selecting the number of candidate RVs with the maximum SNR gain obtained when the formula (4) is met. Assuming that four $N'_{RV}$s are determined in step 504, in which only two $N'_{RV}$s meet the condition shown in the formula (4), Table 1 or Table 2 is queried, to obtain SNR gains corresponding to the two $N'_{RV}$s, and the number of candidate RVs, which corresponds to the maximum SNR gain, in the numbers of candidate RVs is selected as the first number $N_{RV1}$ of candidate RVs from the two $N'_{RV}$s in this embodiment. To meet the delay requirement, the base station may specifically select the number of candidate RVs, which corresponds to the maximum SNR gain, in the numbers of candidate RVs as the second number $N_{RV2}$ of candidate RVs from the numbers of candidate RVs that meet the condition shown in the formula (5). After determining the first number $N_{RV1}$ of candidate RVs and the second number $N_{RV2}$ of candidate RVs, the base station selects the minimum value between the first number $N_{RV1}$ of candidate RVs and the second number $N_{RV2}$ of candidate RVs as the optimum number of RVs, that is, $N_{RV}=MIN(N_{RV1}, N_{RV2})$.

Step 507: The base station queries the preset table of mappings between the SNR gains and the numbers of RVs for different CQIs according to the optimum number of RVs and the adjusted CQI so as to acquire an SNR gain corresponding to the optimum number of RVs.

After determining the optimum number of RVs and the adjusted CQI in the preceding steps, the base station acquires the SNR gain corresponding to the optimum number $N_{RV}$ of RVs by querying the preset table of mappings between the SNR gains and the numbers of RVs for different CQIs, that is Table 1 or Table 2.

Step 508: The base station adjusts the initial transmit power according to the SNR gain corresponding to the optimum number of RVs.

After determining the SNR gain corresponding to the optimum number of RVs, the base station adjusts the initial transmit power according to the SNR gain. Specifically, the following formula (6) or formula (7) may be used to adjust the initial transmit power:

$$P_{adj} = \frac{P_{init}}{10^{\left(\frac{g_{SNR}}{10}\right)}} \quad (6)$$

$$P_{adj} = \frac{P_{init}}{10 * \log_{10}(g_{SNR})} \quad (7)$$

where $P_{init}$ is the initial transmit power, $P_{adj}$ is the adjusted transmit power, and $g_{SNR}$ is the SNR gain corresponding to the optimum number of RVs. In this embodiment, if the unit of the SNR gain is dB, the formula (6) is used to calculate the adjusted transmit power; and if the SNR gain is a dimensionless absolute value, the formula (7) is used to calculate the adjusted transmit power.

The following table 3 is a table of mappings between the numbers of RVs for different CQIs in the HSDPA corresponding to Table 2 and percentages of the transmit power at one TTI:

TABLE 3

Mappings between the numbers of RVs for different CQIs in the HSDPA and the percentages of the transmit power at one TTI

| CQI | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|
| $N_{RV}=2$ | 0.47 | 0.43 | 0.4 | 0.42 | 0.38 | 0.38 | 0.42 | 0.39 | 0.37 | 0.35 | 0.33 | 0.32 | 0.3 | 0.3 | 0.29 | 0.28 | 0.25 | 0.23 |
| $N_{RV}=3$ | 0.3 | 0.28 | 0.27 | 0.28 | 0.25 | 0.25 | 0.28 | 0.25 | 0.23 | 0.21 | 0.2 | 0.19 | 0.17 | 0.17 | 0.16 | 0.16 | 0.13 | 0.13 |
| $N_{RV}=4$ | 0.23 | 0.21 | 0.2 | 0.2 | 0.18 | 0.18 | 0.2 | 0.19 | 0.18 | 0.16 | 0.15 | 0.13 | 0.11 | 0.12 | 0.11 | 0.1 | 0.1 | 0.09 |

As can be seen from Table 3, after this solution is used, when the CQI is 10 and the number of retransmission times is 1, the corresponding transmit power at one TTI is 47% of transmit power in a case where a traditional method is used. As can be seen from the above, if the technical solution of the present invention is used, transmit power used to transmit data at a same TTI can be reduced by more than 50%, and therefore data can be sent to at least two terminals at a TTI.

Step 509: The base station sends notification signaling to the terminal at a TTI used to start HARQ transmission or at a TTI previous to the TTI used to start the HARQ transmission, where the notification signaling carries a modulation and coding manner, available bandwidth, an HARQ process identity of the HARQ transmission, a sequence for sending the RVs, and a TTI number of a response fed back by the terminal.

In this embodiment, before the base station sends data to the terminal, the base station may deliver information about related physical resources to the terminal through notification signaling. Specifically, the base station sends the notification signaling to the terminal at the TTI used to start the HARQ transmission or at the TTI previous to the TTI used to start the HARQ transmission, where the notification signaling carries the modulation and coding manner, the available bandwidth (a code channel), the HARQ process identity of the HARQ transmission, the sequence for sending the RVs, and the TTI number of an ACK/NACK fed back by the terminal, so that the terminal performs data detection on corresponding physical resources according to the notification signaling, and the TTI used to start the HARQ transmission is a first TTI used by the base station to send the RVs to the terminal. The data detection may include receiving data, processing the data, modulating the data, and so on; that is, the terminal is enabled to receive the data in a corresponding code channel and select a corresponding demodulation manner according to the modulation and coding manner so as to demodulate the data. That is, the base station delivers the notification signaling to the terminal at the TTI previous to TTI n used to start the HARQ transmission, where n is an integer greater than 1; for example, in the HSDPA system, the notification signaling may start to be delivered at a second timeslot of a subframe at TTI n−1. Alternatively, the base station may also deliver the notification signaling at the same TTI used to start the HARQ transmission; for example, in the LTE system, the notification signaling may be sent in the first two or three orthogonal frequency division multiplexing (OFDM) symbols of a subframe where the TTI n is located.

In addition, when a system has a limitation on the number of HARQ processes for a user at the same time, that is, when a round trip time (RTT) is fixed, the system may further not use the notification signaling to deliver the TTI number of the ACK/NACK fed back by the terminal. By default, the system may use bundling of a time sequence relationship, for example, in the LTE system, between a TTI for feeding back the ACK/NACK and a TTI of the last RV in the HARQ transmission. If the system has a fixed sequence for sending RVs in the HARQ transmission, the system may not use the notification signaling to notify the sequence for sending the RVs. For example, in the LTE, a sequence of the system for sending the RVs is {RV0, RV2, RV3, RV1} by default. Regardless of the finally determined $N_{RV}$ value ($N_{RV}<=4$), the RVs may be sent one by one at the TTI according to the default sequence.

Step 510: The base station uses $N_{RV}$ TTIs and the adjusted transmit power to consecutively send $N_{RV}$ RVs of a TB to the terminal.

Figure 6:
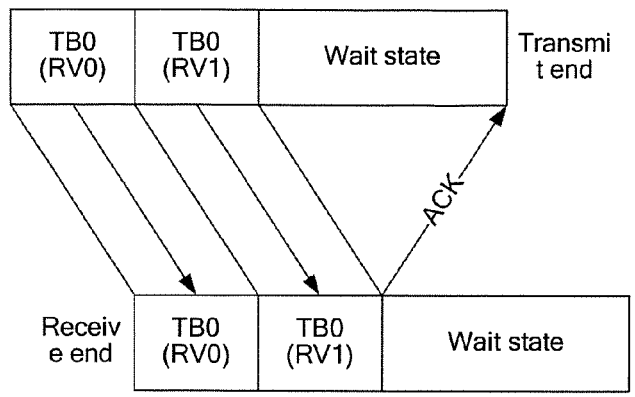
FIG. 6 is a schematic diagram of transmitting, after HARQ energy-saving transmission is performed, a data block in the third embodiment of the method for transmitting data based on an HARQ according to the present invention.
Figure 7:
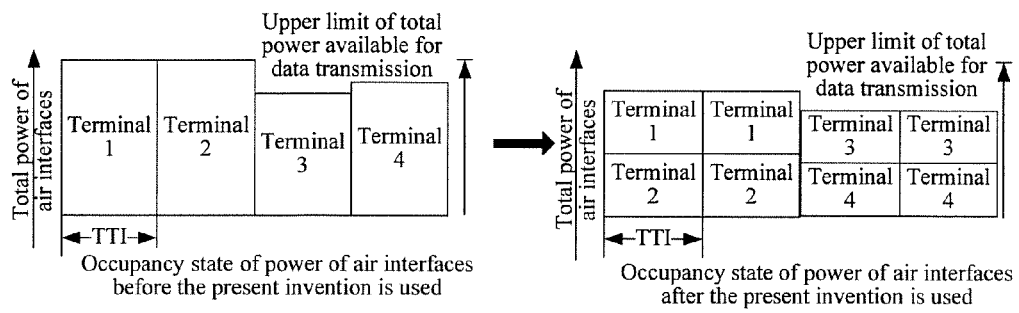
FIG. 7 is a schematic diagram of comparison of the use of transmit power before and after the use of the solution of the present invention in the third embodiment of the method for transmitting data based on an HARQ according to the present invention.

After acquiring, in the preceding steps, the corresponding adjusted transmit power and the optimum number $N_{RV}$ of RVs that meets the QoS requirements of the terminal and allows the terminal to perform the energy-saving transmission, the base station may start from a TTI when data starts to be sent and use the $N_{RV}$ TTIs and the adjusted transmit power to consecutively send the $N_{RV}$ RVs of the TB to the terminal. The $N_{RV}$ RVs may be same RVs, or may be different RVs. FIG. 6 is a schematic diagram of transmitting, after HARQ energy-saving transmission is performed, a data block in the third embodiment of the method for transmitting data based on an HARQ according to the present invention. As shown in FIG. 6, assuming that the optimum number $N_{RV}$ of RVs determined in the preceding steps is 2, the base station uses two TTIs to consecutively send the terminal two RVs of TB0, that is, RV0 and RV1. FIG. 7 is a schematic diagram of comparison of the use of transmit power before and after the use of the solution of the present invention in the third embodiment of the method for transmitting data based on an HARQ according to the present invention. As shown in FIG. 7, one TB of the same size is allocated for transmission at two or more TTIs. After this solution is used, the amount of data, which is transmitted at a TTI, of each terminal is reduced. However, a code channel resource occupied by a terminal is unchanged, which is generally less than or equal to 5, and 15 code channel resources exist in the system. Therefore, power saved at one TTI can be used by another terminal to transmit data, and system throughput is not reduced.

Step 511: The terminal performs combination and channel decoding for the received $N_{RV}$ RVs and feeds back the ACK/NACK to the base station.

After receiving of the $N_{RV}$ RVs is completed within specified time, the terminal may perform the combination and channel decoding for the received RVs. If the terminal succeeds in the decoding, it feeds back the ACK to the base station. If the terminal fails in the decoding, it feeds back the NACK to the base station. At the same time when the terminal feeds back the ACK/NACK, it further feeds back, to the base station, a CQI that ensures a BLER by using transmission for one time, so that the base station starts to perform a next data transmission process after receiving the CQI fed back.

According to the method for transmitting data based on an HARQ provided in this embodiment, a base station adjusts a CQI fed back by a terminal, calculates the optimum number $N_{RV}$ of RVs according to the adjusted CQI, requirements on quality of service of the terminal, and an SNR gain, adjusts initial transmit power according to the optimum number of RVs and the adjusted CQI, and then uses $N_1$ transmission time intervals TTIs and the adjusted transmit power to consecutively send $N_{RV}$ RVs of a TB to the terminal. In this embodiment, the initial transmit power is adjusted to properly reduce instantaneous throughput of a user at a TTI level, and a part of saved transmit power is used according to the accurately calculated optimum number of RVs to support data transmission by other $N_{RV}$ users at a same TTI at the same time, thereby efficiently utilizing power resources and efficiently transmitting data without reducing system throughput at the same time.

A person of ordinary skill in the art may understand that all or a part of the steps in the method embodiments may be implemented by a program instructing relevant hardware. The program may be stored in a computer readable storage medium. When the program is run, the steps in each of the method embodiments are performed. The storage medium may be any medium that is capable of storing program codes, such as a ROM, a RAM, a magnetic disk, or an optical disk.

Figure 8:
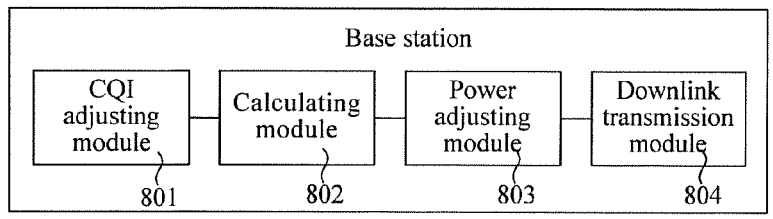
FIG. 8 is a schematic structural diagram of a first embodiment of a base station according to the present invention.

FIG. 8 is a schematic structural diagram of a first embodiment of a base station according to the present invention. As shown in FIG. 8, this embodiment provides a base station that is specifically capable of performing each step in the first method embodiment, and therefore no further details are provided herein. The base station provided in this embodiment may include a CQI adjusting module 801, a calculating module 802, a power adjusting module 803, and a downlink transmission module 804. The CQI adjusting module 801 is configured to adjust, according to current physical resources, a channel quality indicator CQI fed back by a terminal to obtain the adjusted CQI and determine the adjusted CQI and initial transmit power corresponding to the adjusted CQI. The calculating module 802 is configured to calculate the optimum number $N_{RV}$ of redundant versions RVs according to the adjusted CQI, requirements on quality of service of the terminal, and a signal-to-noise ratio SNR gain when the base station performs transmission by using a hybrid automatic repeat request HARQ, where the SNR gain is determined according to a ratio of an SNR when the base station performs transmission without using the HARQ to an SNR when the base station performs transmission by using the HARQ, the optimum number of RVs is the number of RVs required by the base station to send a transport block TB to the terminal, and $N_{RV}$ is a natural number. The power adjusting module 803 is configured to adjust the initial transmit power according to the optimum number of RVs and the adjusted CQI to obtain the adjusted transmit power. The downlink transmission module 804 is configured to send $N_{RV}$ RVs of the TB to the terminal by using $N_{RV}$ transmission time intervals TTIs and the adjusted transmit power.

Figure 9:
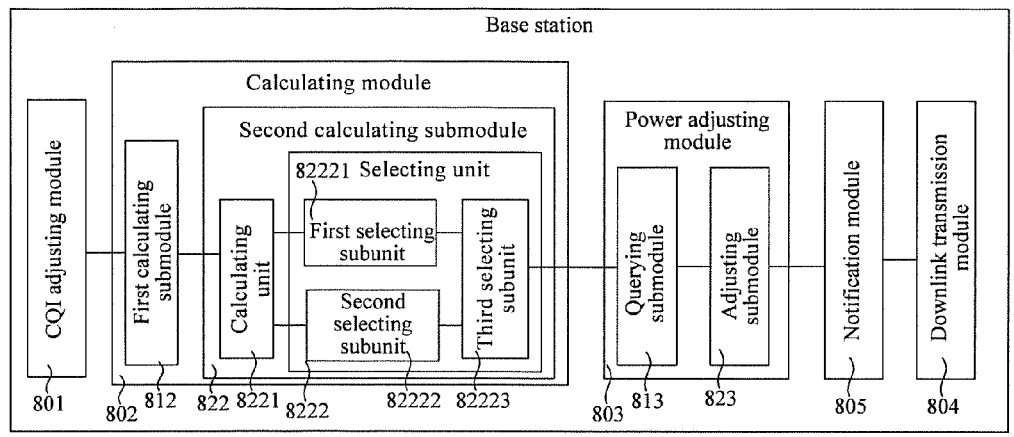
FIG. 9 is a schematic structural diagram of a second embodiment of a base station according to the present invention.

FIG. 9 is a schematic structural diagram of a second embodiment of a base station according to the present invention. As shown in FIG. 9, this embodiment provides a base station that is specifically capable of performing each step in the third method embodiment, and therefore no further details are provided herein. The base station provided in this embodiment is on the basis of the base station shown in FIG. 8. The calculating module 802 may specifically include a first calculating submodule 812 and a second calculating submodule 822. The first calculating submodule 812 is configured to determine, according to the adjusted CQI and a preset table of mappings between SNR gains and the numbers of RVs for different CQIs, the numbers of candidate RVs corresponding to energy-saving transmission of the terminal. The second calculating submodule 822 is configured to determine the optimum number $N_{RV}$ of RVs according to the requirements on quality of service of the terminal and the numbers of candidate RVs.

Specifically, when the requirements on quality of service of the terminal include a guaranteed bit rate GBR requirement and a delay requirement, the second calculating submodule 822 may specifically include a calculating unit 8221 and a selecting unit 8222. The calculating unit 8221 is configured to use the formula (2) to separately calculate a filtering rate at a current TTI according to a filtering rate at a previous TTI, a preset length of a filtering window, a size of a transport block at the current TTI, and the number of candidate RVs. The selecting unit 8222 is configured to select the minimum value in the numbers of candidate RVs as the optimum number $N_{RV}$ of RVs, where the numbers of candidate RVs include the number of RVs that meets a condition that the filtering rate at the current TTI is greater than a preset threshold of the GBR requirement and the number of RVs that meets a condition that a ratio of a data buffer size at the current TTI to the filtering rate at the current TTI is less than a preset threshold of the delay requirement.

More specifically, the selecting unit 8222 in this embodiment may specifically include a first selecting subunit 82221, a second selecting subunit 82222, and a third selecting subunit 82223. The first selecting subunit 82221 is configured to select the number of candidate RVs, which corresponds to the maximum SNR gain, in the numbers of candidate RVs as the first number of candidate RVs from the numbers of candidate RVs, where the number of candidate RVs is the number of RVs that meets the condition that the filtering rate at the current TTI is greater than the preset threshold of the GBR requirement. The second selecting subunit 82222 is configured to select the number of candidate RVs, which corresponds to the maximum SNR gain, in the numbers of candidate RVs as the second number of candidate RVs from the numbers of candidate RVs, where the number of candidate RVs is the number of RVs that meets the condition that the ratio of the data buffer size at the current TTI to the filtering rate at the current TTI is less than the preset threshold of the delay requirement. The third selecting subunit 82223 is configured to select the minimum value between the first number of candidate RVs and the second number of candidate RVs as the optimum number $N_{RV}$ of RVs.

Further, the power adjusting module 803 in this embodiment may specifically include a querying submodule 813 and an adjusting submodule 823. The querying submodule 813 is configured to query the preset table of mappings between the SNR gains and the numbers of RVs for different CQIs according to the optimum number of RVs and the adjusted CQI to acquire an SNR gain corresponding to the optimum number of RVs. The adjusting submodule 823 is configured to use the formula (6) or the formula (7) to adjust the initial transmit power according to the SNR gain corresponding to the optimum number of RVs.

Further, the base station provided in this embodiment may further include a notification module 805. The notification module 805 is configured to send, before the consecutively sending $N_{RV}$ RVs of the TB to the terminal, notification signaling to the terminal at a TTI used to start hybrid automatic repeat request HARQ transmission or at a TTI previous to the TTI used to start the HARQ transmission, where the notification signaling carries a modulation and coding manner, available bandwidth, an HARQ process identity of the HARQ transmission, a sequence for sending the RVs, and a TTI number of a response fed back by the terminal, so that the terminal performs data detection on corresponding physical resources according to the notification signaling, and the TTI used to start the HARQ transmission is a first TTI used by the base station to send the RVs to the terminal.

According to the base station provided in this embodiment, the base station adjusts a CQI fed back by a terminal, calculates the optimum number $N_{RV}$ of RVs according to the adjusted CQI, requirements on quality of service of the terminal, and an SNR gain, adjusts initial transmit power according to the optimum number of RVs and the adjusted CQI, and then uses $N_{RV}$ transmission time intervals TTIs and the adjusted transmit power to consecutively send $N_{RV}$ RVs of a TB to the terminal. In this embodiment, efficient data transmission is implemented without affecting system throughput.

Figure 10:
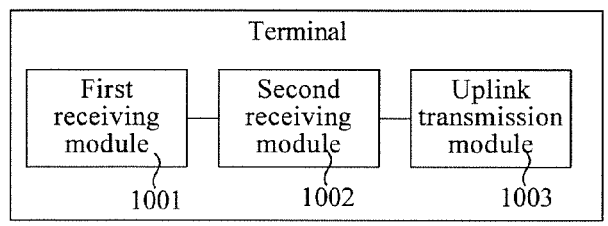
FIG. 10 is a schematic structural diagram of a first embodiment of a terminal according to the present invention.

FIG. 10 is a schematic structural diagram of a first embodiment of a terminal according to the present invention. As shown in FIG. 10, this embodiment provides a terminal that is specifically capable of performing each step in the second method embodiment, and therefore no further details are provided herein. The terminal provided in this embodiment may specifically include a first receiving module 1001, a second receiving module 1002, and an uplink transmission module 1003. The first receiving module 1001 is configured to receive an adjusted channel quality indicator CQI and initial transmit power corresponding to the adjusted CQI, where the adjusted CQI and the initial transmit power are sent by a base station, and the adjusted CQI is obtained by the base station after adjusting a measured CQI according to current physical resources. The second receiving module 1002 is configured to receive the optimum number $N_{RV}$ of RVs calculated by the base station and adjusted transmit power, where the optimum number of RVs is calculated and obtained by the base station according to the adjusted CQI, requirements on quality of service of the terminal, and a signal-to-noise ratio SNR gain when the base station performs transmission by using a hybrid automatic repeat request HARQ, the adjusted transmit power is obtained by the base station by adjusting the initial transmit power according to the optimum number of RVs and the adjusted CQI, the SNR gain is determined according to a ratio of an SNR when the base station performs transmission without using the HARQ to an SNR when the base station performs transmission by using the HARQ, the optimum number of RVs is the number of RVs required by the base station to send a transport block TB to the terminal, and $N_{RV}$ is a natural number. The uplink transmission module 1003 is configured to send $N_{RV}$ RVs of the TB to the base station by using $N_{RV}$ transmission time intervals TTIs and the adjusted transmit power.

Figure 11:
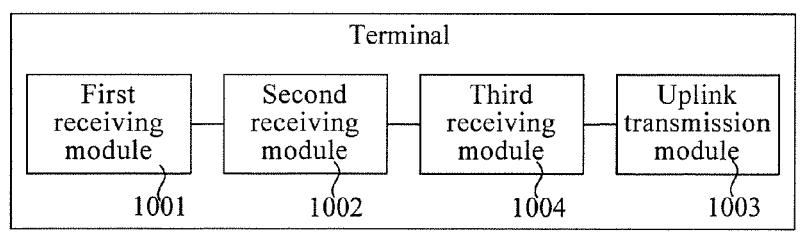
FIG. 11 is a schematic structural diagram of a second embodiment of a terminal according to the present invention.

FIG. 11 is a schematic structural diagram of a second embodiment of a terminal according to the present invention. As shown in FIG. 11, this embodiment provides a terminal that is specifically capable of performing each step in the third method embodiment, and therefore no further details are provided herein. The terminal provided in this embodiment is on the basis of the terminal shown in FIG. 10 and may further include a third receiving module 1004. The third receiving module 1004 is configured to receive, at a TTI previous to a TTI used to start HARQ transmission, notification signaling sent by the base station and perform data detection on corresponding physical resources according to the notification signaling, where the notification signaling carries a modulation and coding manner, available bandwidth, an HARQ process identity of the HARQ transmission, a sequence for sending the RVs, a start number of a TTI used for uplink transmission of the TB, and a TTI number of a response fed back by the base station, the start number of the TTI is notified by the base station, and the TTI used to start the HARQ transmission is a first TTI used by the terminal to send the RVs to the base station.

According to the terminal provided in this embodiment, the terminal receives a CQI adjusted by a base station, receives the optimum number $N_{RV}$ of RVs that is calculated by the base station according to the adjusted CQI, requirements on quality of service of the terminal, and an SNR gain, and adjusts transmit power according to the optimum number of RVs and the adjusted CQI, and the terminal uses $N_{RV}$ transmission time intervals TTIs and the adjusted transmit power to consecutively send $N_{RV}$ RVs of a TB to the base station. In this embodiment, initial transmit power is adjusted to properly reduce instantaneous throughput of a user at a TTI level, and a part of saved transmit power is used according to the accurately calculated optimum number of RVs to support data transmission by other $N_{RV}$ users at a same TTI at the same time, thereby efficiently utilizing power resources and efficiently transmitting data without reducing system throughput at the same time.

Figure 12:
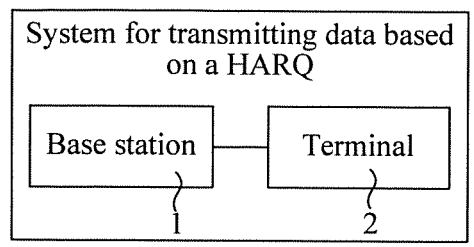
FIG. 12 is a schematic structural diagram of an embodiment of a system for transmitting data based on an HARQ according to the present invention.

FIG. 12 is a schematic structural diagram of an embodiment of a system for transmitting data based on an HARQ according to the present invention. As shown in FIG. 12, this embodiment further provides a system for transmitting data based on an HARQ. The system for transmitting data based on an HARQ may include a base station 1 and a terminal 2, where the base station 1 may specifically be the base station shown in FIG. 8 or FIG. 9, and the terminal 2 may specifically be the terminal shown in FIG. 10 or FIG. 11.

Finally, it should be noted that the foregoing embodiments are merely intended for describing the technical solutions of the present invention rather than limiting the present invention. Although the present invention is described in detail with reference to the foregoing embodiments, a person of ordinary skill in the art should understand that he may still make modifications to the technical solutions described in the foregoing embodiments, or make equivalent replacements to some or all the technical features thereof, without departing from the scope of the technical solutions of the embodiments of the present invention.

What is claimed is:

1. A method for transmitting data based on a hybrid automatic repeat request (HARQ), the method comprising:
adjusting, by a processing device including at least one processor in a base station, according to current physical resources, a channel quality indicator (CQI) fed back by a terminal to obtain an adjusted CQI;
determining, by the processing device, an initial transmit power corresponding to the adjusted CQI;
calculating, by the processing device, an optimum number $N_{RV}$ of redundant versions (RVs) according to the adjusted CQI, a requirement on quality of service of the terminal, and a signal-to-noise ratio (SNR) gain when the base station performs transmission by using an HARQ, wherein the SNR gain is determined according to a ratio of an SNR when the base station performs transmission without using the HARQ to an SNR when the base station performs transmission by using the HARQ, the optimum number $N_{RV}$ is the number of RVs required by the base station to send a transport block (TB) to the terminal, and the optimum number $N_{RV}$ is a natural number;
adjusting, by the processing device, the initial transmit power according to the optimum number $N_{RV}$, and the adjusted CQI to obtain an adjusted transmit power; and
sending, by a transmission device, $N_{RV}$ RVs of the TB to the terminal by using $N_{RV}$ transmission time intervals (TTIs) and the adjusted transmit power.

2. The method according to claim 1, wherein calculating the optimum number $N_{RV}$ comprises:
determining, according to the adjusted CQI and a preset table of mappings between SNR gains and the numbers of RVs under different CQIs, the numbers of candidate RVs corresponding to energy-saving transmission of the terminal; and
determining the optimum number $N_{RV}$ according to the requirement on quality of service of the terminal and the numbers of the candidate RVs.

3. The method according to claim 2, wherein when the requirement on quality of service of the terminal comprises a guaranteed bit rate (GBR) requirement and a delay requirement, determining the optimum number $N_{RV}$ of RVs according to the requirement on quality of service of the terminal and the number of candidate RVs comprises:
using the following formula to calculate a filtering rate at a current TTI according to a filtering rate at a previous TTI, a preset length of a filtering window, a size of a transport block at the current TTI, and the number of the candidate RVs:

$$R(i) = \frac{(N-1)*R(i-1)}{N} + \frac{TBS(i)}{N'_{RV}*N}$$

wherein R(i) is the filtering rate at the current TTI, R(i-1) is the filtering rate at the previous TTI, TBS(i) is the size of the transport block at the current TTI, $N'_{RV}$ is the number of candidate RVs, and the N is the preset length of the filtering window; and
selecting the minimum value in the numbers of candidate RVs as the optimum number $N_{RV}$ of RVs, wherein the numbers of the candidate RVs comprise the number of RVs that meets a condition that the filtering rate at the current TTI is greater than a preset threshold of the GBR requirement, and the number of RVs that meets a condition that a ratio of a data buffer size at the current TTI to the filtering rate at the current TTI is less than a preset threshold of the delay requirement.

4. The method according to claim 3, wherein selecting the minimum value in the numbers of candidate RVs as the optimum number $N_{RV}$ of RVs comprises:
   selecting the number of candidate RVs, which corresponds to the maximum SNR gain, in the numbers of candidate RVs as the first number of candidate RVs from the numbers of candidate RVs, wherein the number of candidate RVs is the number of RVs that meets the condition that the filtering rate at the current TTI is greater than the preset threshold of the GBR requirement;
   selecting the number of candidate RVs, which corresponds to the maximum SNR gain, in the numbers of candidate RVs as the second number of candidate RVs from the numbers of candidate RVs, wherein the number of candidate RVs is the number of RVs that meets the condition that the ratio of the data buffer size at the current TTI to the filtering rate at the current TTI is less than the preset threshold of the delay requirement; and
   selecting the minimum value between the first number of candidate RVs and the second number of candidate RVs as the optimum number $N_{RV}$ of RVs.

5. The method according to claim 1, wherein adjusting the initial transmit power according to the optimum number of RVs and the adjusted CQI comprises:
   querying the preset table of mappings between the SNR gains and the numbers of RVs under different CQIs according to the optimum number of RVs and the adjusted CQI so as to acquire an SNR gain corresponding to the optimum number of RVs; and
   using the following formula to adjust the initial transmit power according to the SNR gain corresponding to the optimum number of RVs:

$$P_{adj} = \frac{P_{init}}{10^{\left(\frac{g_{SNR}}{10}\right)}},$$

or $$P_{adj} = \frac{P_{init}}{10 * \log_{10}(g_{SNR})}$$

wherein $P_{init}$ is the initial transmit power, $P_{adj}$ is the adjusted transmit power, and $g_{SNR}$ is the SNR gain corresponding to the optimum number of RVs.

6. The method according to claim 1, wherein before sending the $N_{RV}$ RVs of the TB to the terminal, the method further comprises:
   sending a notification signaling to the terminal at a TTI used to start HARQ transmission or at a TTI previous to the TTI used to start the HARQ transmission, wherein the notification signaling carries a modulation and coding manner, available bandwidth, a HARQ process identity of the HARQ transmission, a sequence for sending the RVs, and a TTI number of a response fed back by the terminal, and
   wherein the TTI used to start the HARQ transmission is a first TTI used by the base station to send the RVs to the terminal.

7. A method for transmitting data based on a hybrid automatic repeat request (HARQ), comprising:
   receiving an adjusted channel quality indicator (CQI) and an initial transmit power corresponding to an adjusted CQI, wherein the adjusted CQI and the initial transmit power are sent by a base station, and the adjusted CQI is obtained by the base station after adjusting a measured CQI according to current physical resources;
   receiving an optimum number $N_{RV}$ of redundant versions (RVs) calculated by the base station and an adjusted transmit power, wherein the optimum number $N_{RV}$ of RVs is calculated and obtained by the base station according to the adjusted CQI, requirements on quality of service of a terminal, and a signal-to-noise ratio (SNR) gain when the base station performs transmission by using an HARQ, the adjusted transmit power is obtained by the base station by adjusting the initial transmit power according to the optimum number $N_{RV}$ of RVs and the adjusted CQI, the SNR gain is determined according to a ratio of an SNR when the base station perfoms transmission without using the HARQ to an SNR when the base station performs transmission by using the HARQ, the optimum number $N_{RV}$ of RVs is the number of RVs required by the base station to send a transport block (TB) to the terminal, and $N_{RV}$ is a natural number; and
   sending the optimum number $N_{RV}$ of RVs of the TB to the base station by using $N_{RV}$ transmission time intervals (TTIs) and the adjusted transmit power.

8. The method according to claim 7, further comprising:
   receiving, at a TTI previous to a TTI used to start HARQ transmission, a notification signaling sent by the base station and performing a data detection on corresponding physical resources according to the notification signaling, wherein the notification signaling carries a modulation and coding manner, available bandwidth, an HARQ process identity of the HARQ transmission, a sequence for sending the RVs, a start number of a TTI used for uplink transmission of the TB, and a TTI number of a response fed back by the base station, the start number of the TTI is notified by the base station, and
   wherein the TTI used to start the HARQ transmission is a first TTI used by the terminal o send the RVs to the base station.

9. A base station, comprising:
   a processor; and
   memory coupled to the processor, the memory comprising instructions that, when executed by the processor, cause the base station to:
   adjust, according to current physical resources, a channel quality indicator (CQI) fed back by a terminal to obtain an adjusted CQI and determine an initial transmit power corresponding to the adjusted CQI;
   calculate an optimum number $N_{RV}$ of redundant versions (RVs) according to the adjusted CQI, requirements on quality of service of the terminal, and a signal-to-noise ratio (SNR) gain when the base station performs transmission by using a hybrid automatic repeat request (HARQ), wherein the SNR gain is determined according to a ratio of an SNR when the base station performs transmission without using the HARQ to an SNR when the base station performs transmission by using the HARQ, the optimum number $N_{RV}$ of RVs is the number of RVs required by the base station to send a transport block (TB) to the terminal, and $N_{RV}$ is a natural number;
   adjust the initial transmit power according to the optimum number $N_{RV}$ of RVs and the adjusted CQI to obtain the adjusted transmit power; and send the optimum number $N_{RV}$ of RVs of the TB to the terminal by using $N_{RV}$ transmission time intervals (TTIs) and the adjusted transmit power.

10. The base station according to claim 9, wherein the memory further comprises instructions that, when executed by the processor, cause the base station to:
   determine, according to the adjusted CQI and a preset table of mappings between SNR gains and the numbers of RVs under different CQIs, the numbers of candidate RVs corresponding to energy-saving transmission of the terminal; and
   determine the optimum number $N_{RV}$ of RVs according to the requirements on quality of service of the tei iinal and the numbers of candidate RVs.

11. The base station according to claim 10, wherein when the requirements on quality of service of the terminal comprise a guaranteed bit rate (GBR) requirement and a delay requirement, the memory further comprises instructions that, when executed by the processor, cause the base station to:
   use the following formula to calculate a filtering rate at a current TTI according to a filtering rate at a previous TTI, a preset length of a filtering window, a size of a transport block at the current TTI, and the number of candidate RVs:

$$R(i) = \frac{(N-1)*R(i-1)}{N} + \frac{TBS(i)}{N'_{RV}*N};$$

wherein R(i) is the filtering rate at the current TTI, R(i-1) is the filtering rate at the previous TTI, TBS(i) is the size of the transport block at the current TTI, $N'_{RV}$ is the number of candidate RVs, and the N is the preset length of the filtering window; and
   select the minimum value in the numbers of candidate RVs as the optimum number $N_{RV}$ of RVs, wherein the numbers of candidate RVs comprise the number of RVs that meets a condition that the filtering rate at the current TTI is greater than a preset threshold of the GBR requirement and the number of RVs that meets a condition that a ratio of a data buffer size at the current TTI to the filtering rate at the current TTI is less than a preset threshold of the delay requirement.

12. The base station according to claim 11, wherein the memory further comprises instructions that, when executed by the processor, cause the base station to:
   select the number of candidate RVs, which corresponds to the maximum SNR gain, in the numbers of candidate RVs as the first number of candidate RVs from the numbers of candidate RVs, wherein the number of candidate RVs is the number of RVs that meets the condition that the filtering rate at the current TTI is greater than the preset threshold of the GBR requirement;
   select the number of candidate RVs, which corresponds to the maximum SNR gain, in the numbers of candidate RVs as the second number of candidate RVs from the numbers of candidate RVs, wherein the number of candidate RVs is the number of RVs that meets the condition that the ratio of the data buffer size at the current TTI to the filtering rate at the current TTI is less than the preset threshold of the delay requirement; and
   select the minimum value between the first number of candidate RVs and the second number of candidate RVs as the optimum number $N_{RV}$ of RVs.

13. The base station according to claim 9, wherein the memory further comprises instructions that, when executed by the processor, cause the base station to:
   query the preset table of mappings between SNR gains and the numbers of RVs for different CQIs according to the optimum number $N_{RV}$ of RVs and the adjusted CQI to acquire an SNR gain corresponding to the optimum number of RVs; and
   use the following formula to adjust the initial transmit power according to the SNR gain corresponding to the optimum number of RVs:

$$P_{adj} = \frac{P_{init}}{10^{(\frac{g_{SNR}}{10})}},$$

or $$P_{adj} = \frac{P_{init}}{10*\log_{10}(g_{SNR})}$$

wherein $P_{init}$ is the initial transmit power, $P_{adj}$ is the adjusted transmit power, and $g_{SNR}$ is the SNR gain corresponding to the optimum number of RVs.

14. The base station according to claim 9, wherein the memory further comprises instructions that, when executed by the processor, cause the base station to:
   send, before sending the $N_{RV}$ RVs of the TB to the terminal, notification signaling to the terminal at a TTI used to start hybrid automatic repeat request HARQ transmission or at a TTI previous to the III used to start the HARQ transmission, wherein the notification signaling carries a modulation and coding manner, available bandwidth, an HARQ process identity of the HARQ transmission, a sequence for sending the RVs, and a TTI number of a response fed back by the terminal, so that the terminal performs data detection on corresponding physical resources according to the notification signaling, and
   wherein the TTI used to start the HARQ transmission is a first TTI used by the base station to send the RVs to the terminal.

15. A terminal, comprising:
   a processor; and
   memory coupled to the processor, the memory comprising instructions that, when executed by the processor, cause the terminal to:
   receive an adjusted channel quality indicator (CQI) and an initial transmit power corresponding to the adjusted CQI, wherein the adjusted CQI and the initial transmit power are sent by a base station, and the adjusted CQI is obtained by the base station after adjusting a measured CQI according to current physical resources;
   receive the optimum number $N_{RV}$ of redundant versions (RVs) calculated by the base station and adjusted transmit power, wherein the optimum number $N_{RV}$ of RVs is calculated and obtained by the base station according to the adjusted CQI, requirements on quality of service of the terminal, and a signal-to-noise ratio (SNR) gain when the base station performs transmission by using a hybrid automatic repeat request (HARQ), the adjusted transmit power is obtained by the base station by adjusting the initial transmit power according to the optimum number $N_{RV}$ of RVs and the adjusted CQI, the SNR gain is determined according to a ratio of an SNR when the base station performs transmission without using the HARQ to an SNR when the base station performs transmission by using the HARQ, the optimum number $N_{RV}$ of RVs is the number of RVs required by the base station to send a transport block (TB) to the terminal, and $N_{RV}$ is a natural number; and send $N_{RV}$ RVs of the TB to the base station by using $N_{RV}$ transmission time intervals (TTIs) and the adjusted transmit power.

16. The tee urinal according to claim 15, further comprising wherein the memory further comprises instructions that, when executed by the processor, cause the terminal to:

receive, at a TTI previous to a TTI used to start HARQ transmission, notification signaling sent by the base station and performing data detection on corresponding physical resources according to the notification signaling, wherein the notification signaling carries a modulation and coding manner, available bandwidth, an HARQ process identity of the HARQ transmission, a sequence for sending the RVs, a start number of a TTI used for uplink transmission of the TB, and a TTI number of a response fed back by the base station, the start number of the TTI is notified by the base station, and wherein the TTI used to start the HARQ transmission is a first TTI used by the terminal to send the RVs to the base station.

* * * * *